INVENTOR
WILLIAM W. THOMAS

BY Roland C. Rehm
ATTORNEY

Jan. 2, 1962   W. W. THOMAS   3,015,316
COUNTERBALANCE VALVES AND THE LIKE
Filed Jan. 8, 1959   5 Sheets-Sheet 2
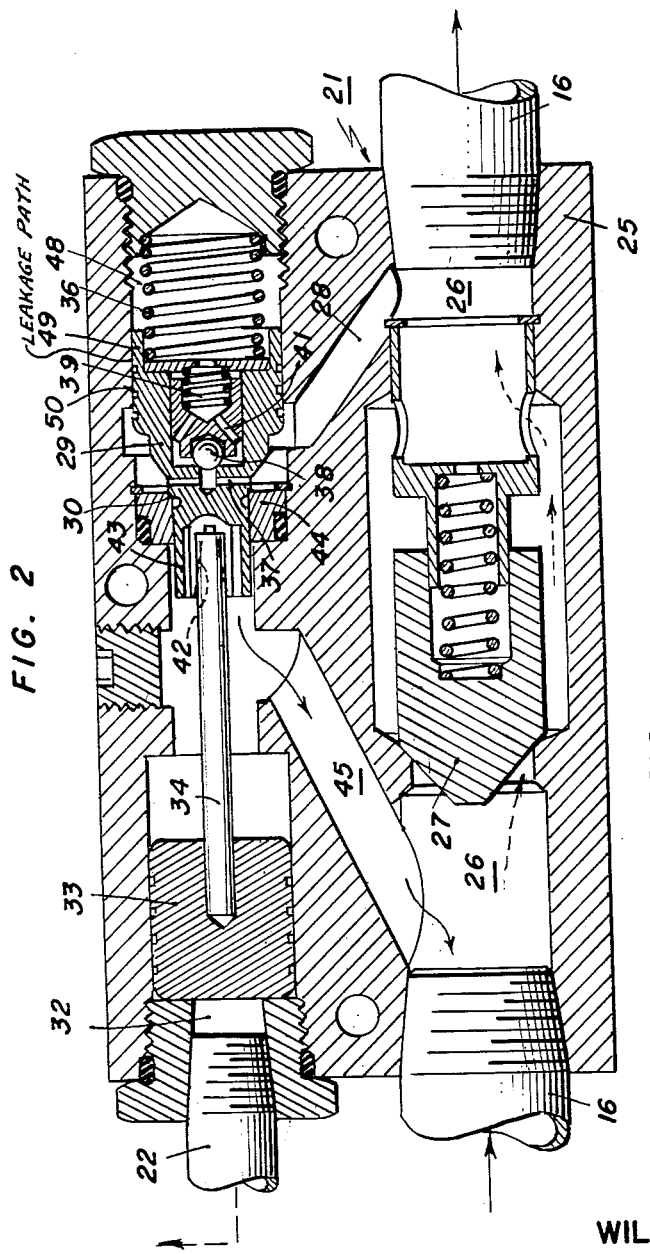
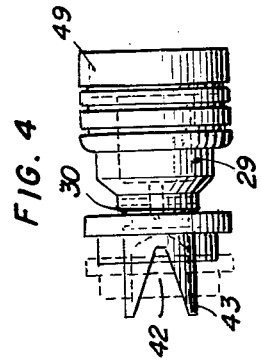
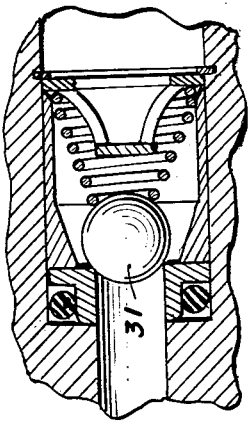
INVENTOR.
WILLIAM W. THOMAS
BY
Roland C. Rehm
ATTORNEY

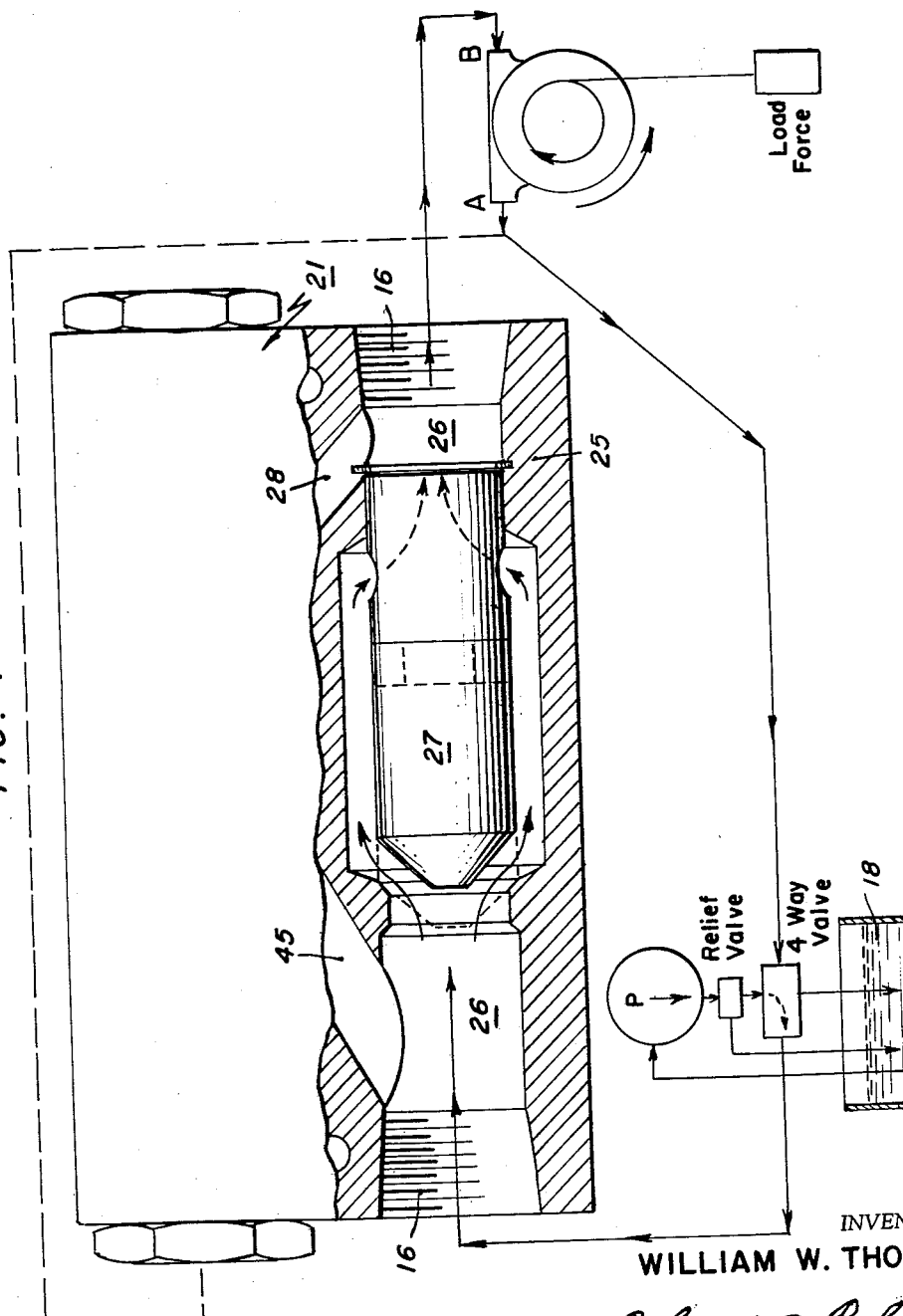

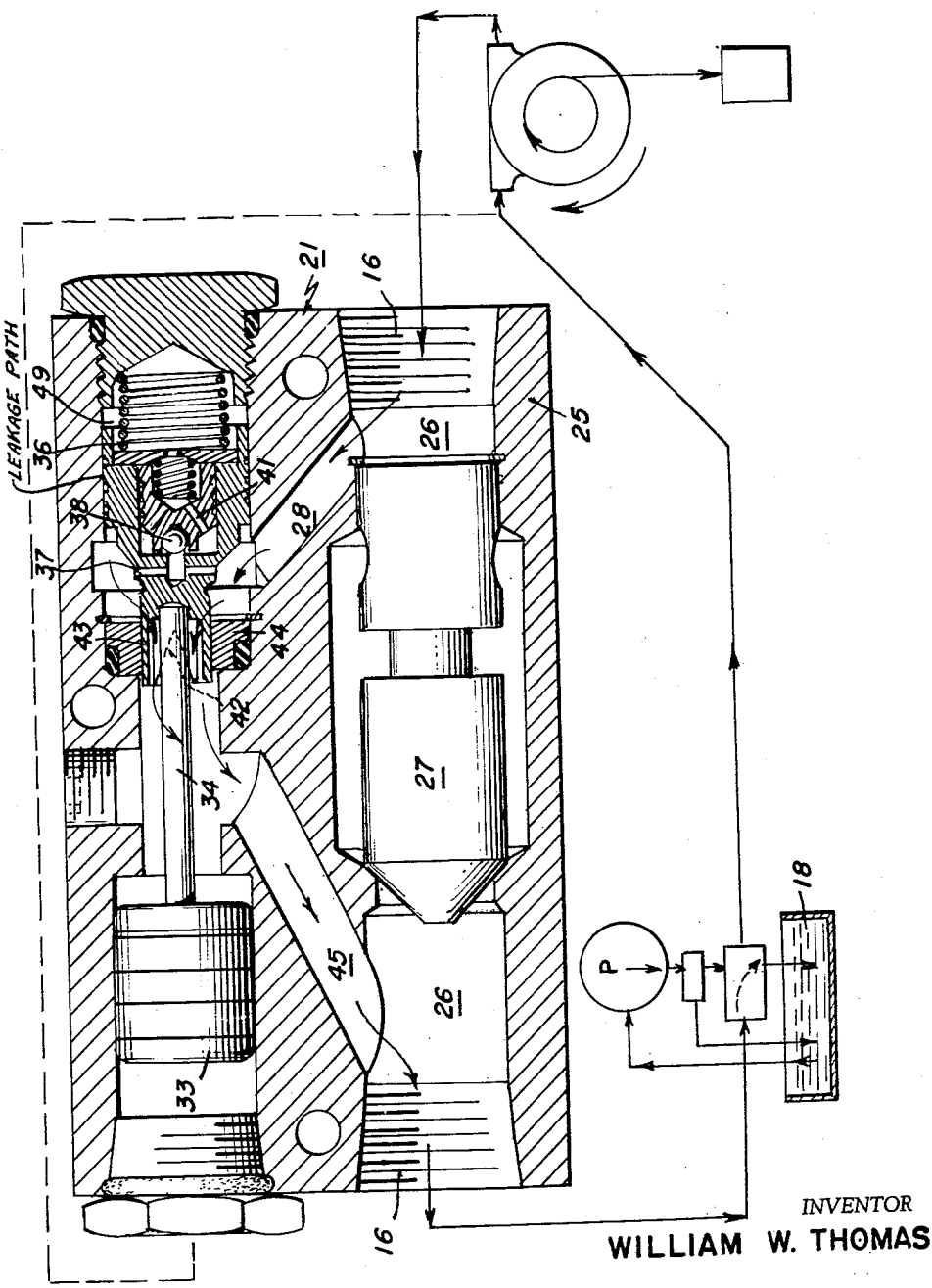

Jan. 2, 1962 W. W. THOMAS 3,015,316
COUNTERBALANCE VALVES AND THE LIKE
Filed Jan. 8, 1959 5 Sheets-Sheet 5
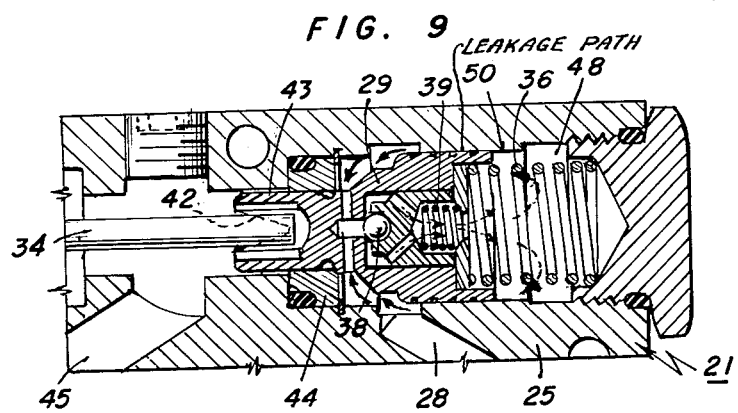
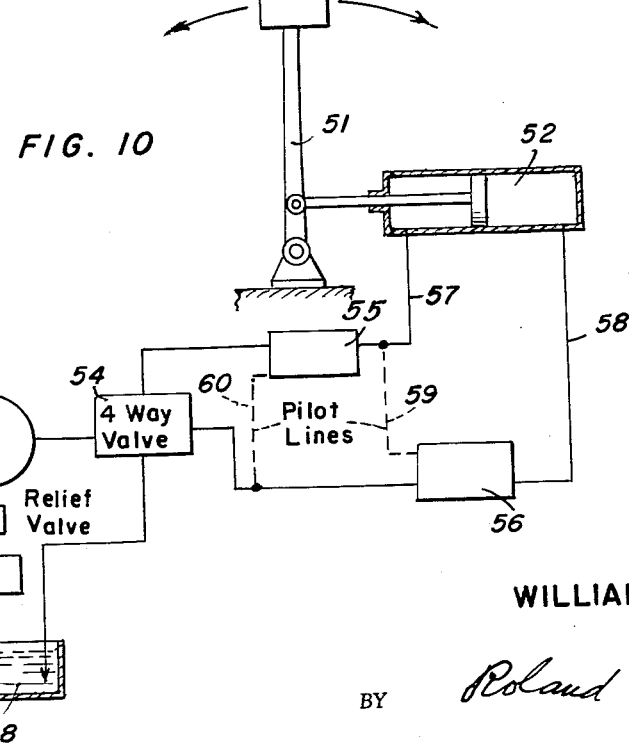
INVENTOR
WILLIAM W. THOMAS
BY Roland C. Rehm
ATTORNEY United States Patent Office 3,015,316
Patented Jan. 2, 1962

1

3,015,316
COUNTERBALANCE VALVES AND THE LIKE
William W. Thomas, Glenview, Ill., assignor to
William Waterman, Evanston, Ill.
Filed Jan. 8, 1959, Ser. No. 785,701
6 Claims. (Cl. 121—46.4)

This invention relates to so-called counter-balance valves and to hydraulic systems in which the same are used.

The inventive valve makes it possible to control the operation of and supply of fluid to a hydraulic motor under all load conditions including those where the load is negative and the motor tends to run ahead of its fluid supply; and in this instance control under the latter conditions is effected by operation of a single instrumetality.

The nature of the invention and further details thereof may be readily understood by reference to one illustrative valve and system embodying the invention and shown in the accompanying drawings.

In said drawings:

FIG. 2 is a longitudinal section on an enlarged scale of the counter-balance valve;

FIG. 3 is a section showing another form of check valve for use in the counter-balance valve;

FIG. 4 is a detail showing valve, valve seat and one form of port for controlling flow;

FIG. 7 and 8 are in the nature of diagrams illustrating the operation of the counter-balance valve during different phases of a cycle;

FIG. 9 is a fragmentary view (being a portion of FIG. 2) illustrating the operation of the dash pot to retard opening movement of the valve while permitting rapid closing movement; and FIG. 10 is a diagram of a circuit wherein negative loading can occur in both directions of travel.

Figure 5:
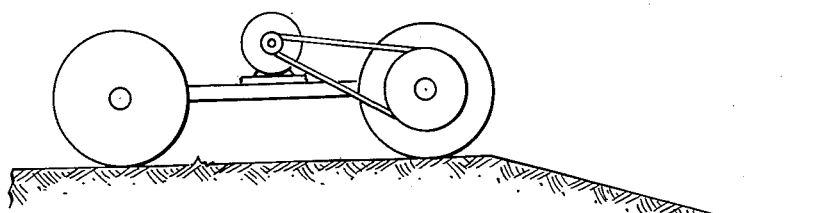
FIG. 5 and 6 are diagrams of illustrative hydraulic motor systems in which the counter-balance valve is useful.
Figure 6:
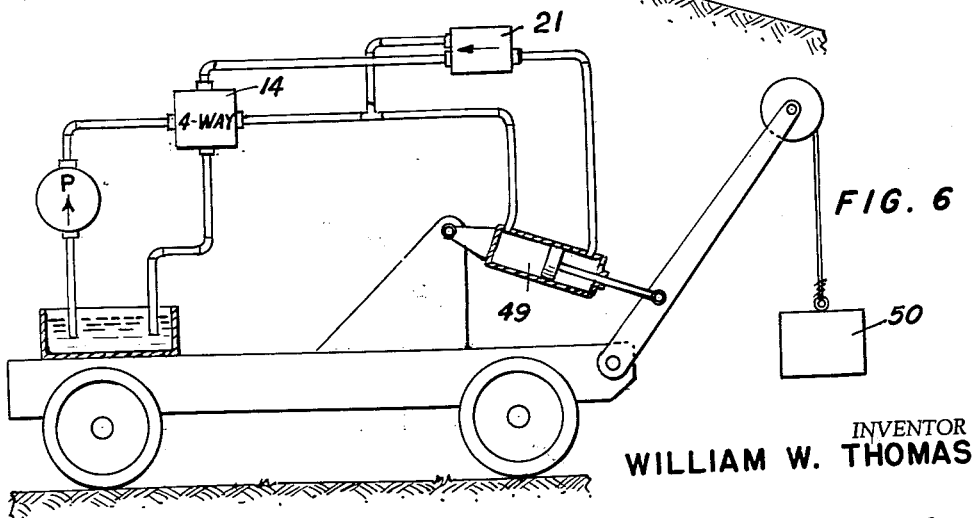

There are many hydraulic motor systems in which at times a negative load exists and the load tends to run ahead of the rate of supply of hydraulic fluid to the motor. For example, a hydraulically driven vehicle of which there are many examples, would tend to run away when it is on a down grade (see FIG. 5). Similarly a hydraulically operated crane boom (see FIG. 6) because of the load on it and the action of gravity, tends to run ahead of the hydraulic motor operating it when the load is being lowered. This applies to all forms of hydraulic motors, e.g. rotary vane or gear motors, piston or ram-type motors, etc.

In such cases, the motor may be checked or controlled by controlling the discharge from the motor, but this has heretofore required operation of control separate from and in addition to the control for supplying hydraulic fluid to the motor. In the present system, actuation of the valve controlling supply to the motor, with the aid of the counter-balance valve, automatically controls or limits discharge therefrom to the rate of supply.

In the illustrative system (see for example FIG. 1), discharge from port B of the hydraulic motor 10 is controlled to prevent the motor from running away under negative load when it is rotating, for example, in a clockwise direction as indicated by arrow 11. The motor 10 is in this instance a rotary motor, but the same system would be used for a motor comprising a double acting piston and cylinder such as that of FIG. 6. Means for supplying pressure fluid to the motor is represented by pump 12. Pressure fluid from the source of supply is

2 carried by line 13 to a main valve here represented by a 4-way valve 14. Line 15 connects valve 14 with port A of the motor and line 16 with port B. (See FIGS. 1 and 2). Discharge passing through lines 15 or 16 to valve 14 is conducted therefrom by line 17 to a reservoir 18.

As here illustrated, when the motor is rotating in a clock-wise direction, (during which it may be negatively loaded and tend to run away) pressure fluid is supplied (by appropriate manipulation of main valve 14) through line 15 and discharge from port B is carried by line 16. Control of discharge to prevent the motor from running away is effected automatically by counter-balance valve 21 interposed in line 16. Operation of valve 21 is controlled by pressure in supply line 15 as next described, by a pilot line 22 leading from line 15.

Referring to FIG. 2, valve housing 25 is provided with a "free flow" passage 26 through which flow may freely pass from the 4-way valve to line 16 and port B of the motor when the latter is operated in a counter clock-wise direction. Passage 26 is provided with an appropriate check valve 27 to prevent free flow through the passage in the opposite direction, that is when the motor is turning clock-wise and discharge is from port B. In such case return or discharge flow can only pass from line 16 through passage 28 in the counter-balance valve housing. The latter passage is controlled and throttled by poppet control valve 29 which when closed seats on seat 30.

The form of the check valve 27 may be varied widely from that shown in FIG. 2 to the ball check 31 shown in FIG. 3. Any check valve appropriate to the volume of flow may be used.

When the 4-way valve 14 is positioned for clock-wise rotation of motor 10, pump flow is directed to port A of the motor, but before rotation can occur, the motor must be free to discharge from port B through passage 28 (FIG. 2) which is normally closed by poppet valve 29 but is opened to the degree necessary as follows: Pump pressure besides being applied to port A is also applied through line 22 to the pilot port 32 of the valve and acts on pilot piston 33 which in turn acts through plunger pin 34 to unseat poppet valve 29. Unseating occurs despite back pressure on poppet valve 29 because the area of piston 33 is larger than the seated area of valve 29. Forces opposing unseating of valve 29 are the light spring 36 and the back pressure from passage 28. This pressure is applied not only to the exterior of the valve but to its interior through passage 37 which unseats check valve 38 (normally seated by light spring 39) and reaches the interior of the valve through passage 41. Thus the only unbalanced force on piston 29 arising from the fluid back pressure from passage 28, is that on the seated area of valve 29.

As valve 29 is moved from its seat, a port slot 42 (FIGS. 2 and 4) in the skirt 43 is progressively uncovered as it passes the annular member 44 which provides valve seat 30. Slot 42 is here shown as V-shaped but it may have other shapes depending somewhat on the volume of flow designed to pass through the slot. Flow passing the slot reaches discharge through passage 45 and line 16 to valve 14 and line 17. Discharge from port B thus permits a corresponding pump flow into port A.

Sudden opening of valve 29 which might result in chattering or hunting, is prevented because the fluid trapped in the space 48 behind the valve piston can escape only slowly through the slight clearance space between the piston skirt 49 and the bore wall of cylinder 50. Check valve 38 while permitting ready flow into space 48 prevents outflow through passage 37. The operation of the dash pot to retard opening movement of the valve 29, while permitting rapid closing, is illustrated in FIG. 9 wherein the solid line arrows represent controlled flow from the dash pot chamber 48 through the small clearance space between the valve piston and the cylinder walls, and wherein the dotted lines show how the flow may rapidly fill the chamber 48 by unseating check valve 38, thereby permitting rapid closing of the valve 29. Such rapid closing is desirable to permit rapid shut-off of flow so that rapid stopping of the motor is possible whenever necessary.

As valve 29 continues its opening movement, flow from port B increases (due to increase in effective size of the port resulting from uncovering of larger areas of slot 42) until full output of the pump can enter port A of the motor. On the other hand, if, due to negative load or tendency of the motor to run ahead of the pump supply, the pump pressure in pilot line 22 drops, the force on pilot piston 33 would decrease and it together with valve 29 would move to a position of balance between the back pressure of forces from port A tending to close the valve and the force of the pilot piston 33 tending to open the valve.

For example, assume that the area of pilot piston 33 is four times the seated area of valve 29, and that the pressure at port B of the motor is 1000 p.s.i., and also that the pump output is constant at 5 g.p.m. With the 4-way valve 14 positioned to direct flow to port A of the motor, pump pressure will arise rapidly since no flow can occur (valve 29 being closed) this pressure acting on pilot piston 33 is equal to pump pressure in the line to port A of the motor, and is sufficient to unseat valve 29. While it would seem that this pressure would only be one-fourth the back pressure on valve 29 (since the pilot valve is four times the seated area of valve 29) mathematically, the pressure on the pilot piston is only one-third the back pressure on valve 29 since the pump pressure reacts across the motor and is additive to the load pressure.

Motion of valve 29 will continue until the flow into port A reaches 5 g.p.m., which is the assumed pump output. Any further opening of control valve 29 will tend sharply to reduce pump pressure and consequently the pressure of pilot piston 33.

As stated above, the trapping of fluid in space 48 behind valve piston 49 prevents oscillation or hunting of the valve through the dash pot action of the valve. Pump flow rate (to port A) can be varied (by the 4-way valve or by varying pump output) and valve 29 will automatically move to control discharge flow from port B of the motor to a corresponding rate. The small check valve 38 allows rapid movement of valve 29 toward its seat, which quickly checks any tendency of the motor to run away under negative load and holds its speed under such negative load to that determined by the rate of flow from the pump. Note that when the load is positive (with clockwise rotation of the motor) valve 29 will move to its fully open position and pass flow with very low pressure drop. Then if the load again becomes negative, valve 29 will move to the proper throttling position to maintain complete control of the operation of the motor.

Figure 1:
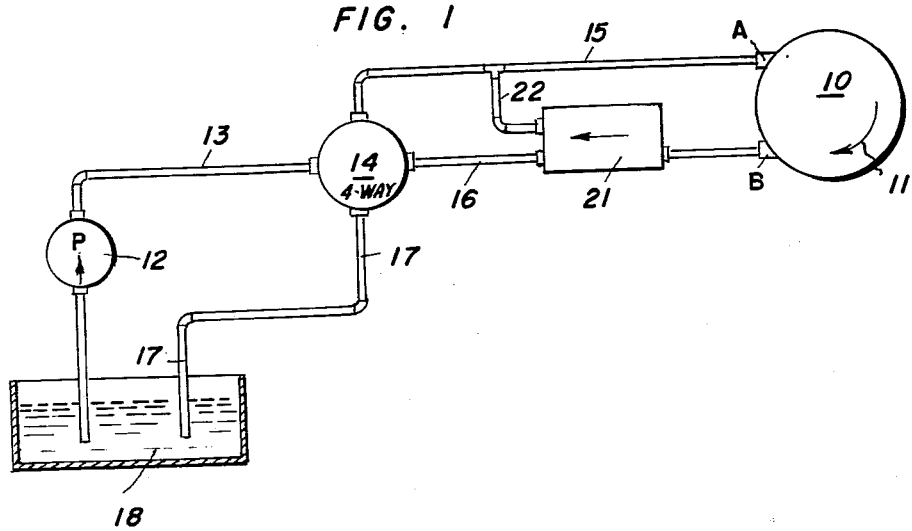
FIG. 1 is a diagram of a hydraulic system wherein the hydraulic motor is controlled as aforesaid by a counter-balance valve.

For control of a double acting piston and cylinder 49 (like that shown in FIG. 6), the control circuit is identical with that of FIG. 1, the fluid lines running to the opposite ends of the cylinder. The negative load results from the pull of load 50 on the boom.

FIGS. 7 and 8 are in the nature of diagrams to illustrate the operation of the counter-balance valve during various phases of operation of a circuit for controlling an instrumentality represented by a cable winch, wherein there is a positive load during raising and a negative load during lowering. FIG. 7 illustrates the flow pattern during the raising phase of the cycle wherein the load is positive. In that case, flow travels to the motor freely and with little pressure drop by opening the check valve 27. Pilot piston 33 does not move since the pressure is higher on its inner face than on its port face. Control valve 29 will remain seated since very high flow would be required through check valve 27 to produce enough pressure drop to unseat valve 29 against the pressure of its spring 36, even though the spring is a relatively light spring.

FIG. 8 illustrates conditions existing when the 4-way valve 14 is positioned to lower the load, the loading being negative. Pump flow is then directed to the reservoir at low pressure. The force of the load produces pressure at motor port B. Flow from port B is blocked by counter-balance valve 29 since check valve 27 and valve 29 are seated more firmly by the very pressure (created by the load) tending to produce flow. The line to port A of the motor and that leading to the pilot piston 33 are not under pressure and piston 33 cannot therefore be acted on.

FIG. 2 will serve to illustrate in connection with FIGS. 7 and 8, the flow pattern during the "lowering" phase of the cycle wherein the load of the motor is negative as already described (and here repeated for convenience), pump flow is directed to port A of the motor, but flow from port B cannot occur until the pressure in the line to port A of the motor and therefore to the pilot piston 33 rises sufficiently (which occurs quite promptly) to cause the pilot piston to unseat valve 29. This permits return flow only to the extent corresponding to pump output to port A. The dash pot action prevents over-shooting of valve 29 beyond the position necessary to attain the aforesaid control of outflow from port B. When sufficient flow from port B can occur to accommodate full pump output, the pump pressure will drop rapidly to a value just sufficient to balance the force of pilot piston 33 against the opposing force of control valve 29, and the proper throttling action of valve 29 is thereby maintained. Thus, an increase in pump output will result in a corresponding increase in opening of valve 29, and a decrease in pump output will result in a corresponding closing movement of valve 29, so that the negative load is always positively controlled by pump output, and running ahead of pump supply cannot occur.

As stated above, the counter-balance valve may be used in other types of circuits than that illustrated and described herein. Indeed it may be used in any circuit in which flow in one part of the circuit is to be controlled by the pressure (and the flow producing such pressure) existing in another portion of the circuit.

This method of control greatly simplifies the duties of the operator, for it eliminates any need for concern with tendency to run away under negative load. The motor speed is automatically adjusted (whether under positive or negative load) to the fluid supply.

If controls in both directions be desired, i.e. clock-wise and counter clock-wise, if the motor be a rotary motor, or for both ends of a double acting cylinder and piston, two control valves may be used, one in each of the discharge lines and pilot line connections to each of the supply lines. Such a circuit is illustrated in FIG. 10, wherein an oppositely tilting boom or mast 51 (which therefore has negative loads in two directions) is illustrated. The hydraulic motor is in the instance represented by the double acting piston and cylinder 52, supplied from pump 53 through the control of 4-way valve 54. Counter-balance valves 55 and 56, like that illustrated in FIG. 2, are placed respectively in lines 57 and 58, leading to the respective ends of the cylinder. Pilot lines 59 and 60 controlling the respective valves, are cross-connected to the respective supply lines for the same purpose as described in connection with FIG. 2.

The illustrative valve allows the pump to operate at a relatively low pressure when controlling a negative load. When the load changes from negative to positive, the throttling means opens fully, allowing the pump to handle the positive load at the minimum pressure, since the pressure loss in the present valve is low. Prior valve arrangements comprising a relief valve for controlling discharge flow in combination with a check valve for allowing unrestricted inlet flow, result in great loss of efficiency and much higher peak loads on the pump. Since the relief valve must be set to remain closed at the maximum load pressure, the pump must supply the difference in pressure existing between the existing load pressure and the relief valve setting. At maximum negative load the pump would be worked at low pressure. With very light negative loads, the pump would be worked at nearly maximum load pressure. With full positive load, the pump would be worked at twice the maximum load pressure. In the present valve where the pump flow is generally constant (being determined by the speed of the main power source, generally an internal combustion engine), there is a very low load on the pump during negative loads, and the maximum load on the pump never exceeds that imposed by the positive load, whatever it is, plus of course fluid friction loss.

Thus, the operator can positively control the speed of both positive and negative loads simply by varying pump i.e. engine speed.

Obviously, the invention is not limited to the details of the illustrative embodiments herein illustrated and described, since these may be variously modified. Moreover, it is not indispensable that all features of the invention be used conjointly, since various features may be used to advantage in different combinations and subcombinations.

Having described my invention, I claim:

1. In a system for controlling a hydraulic motor the combination comprising a hydraulic motor having inlet and discharge, a source of pressure fluid including lines leading respectively to said inlet and discharge, a counterbalance valve interposed in said discharge line, said valve having throttling valve means controlling discharge through said discharge line, said throttling valve means having pressure responsive means for controlling its operation, a pilot line leading from said inlet line to said pressure responsive means to render the latter responsive to pressure in said inlet line, and a by-pass passage for said discharge line around said throttling valve means and having therein a check valve to limit flow through said by-pass passage to flow in a direction opposite to discharge flow.

2. In a system for controlling a hydraulic motor the combination comprising a double-acting hydraulic motor, a source of pressure fluid, lines leading from said source to said motor to carry pressure fluid to said motor and to return discharge from said motor to said source respectively, a control valve for selectively connecting one line to pressure fluid and the other line to discharge, counter-balance valves in each of said lines, said valves including throttling valves to throttle discharge flow through the line, said throttling valves having pressure responsive means for actuating said throttling valves in response to pressure, pilot lines for connecting the respective pressure responsive line to the line conducting pressure fluid to said motor, thereby to render the throttling of flow in the discharge line responsive to pressure in the supply line.

3. The combination with a source of pressure fluid of a counterbalance valve comprising a valve housing, a discharge passage in said housing for flow in one direction, a valve controlling discharge through said passage, a supply passage in said housing by-passing said valve to carry fluid flow in the opposite direction around said valve, a check valve in said supply passage closing the latter passage to discharge flow there through and confining discharge flow to flow through the discharge passage controlled by said valve, pressure responsive piston means in said housing and connected with said pressure source for unseating said valve responsively to the pressure of said pressure source against said piston, and a dash pot cylinder and dash pot piston for limiting the rate of opening movement of said valve, and a by-pass check valve to permit rapid filling of said dash pot cylinder to insure unrestricted closing of said valve.

4. The combination with a source of pressure fluid of a counterbalance valve of the character described comprising a valve housing, a discharge passage in said housing, a valve controlling discharge through said passage, a by-pass passage in said housing by-passing said valve to carry fluid flow in the opposite direction around said valve, a check valve in said by-pass passage closing the latter passage to discharge flow there through and confining discharge flow to flow through said discharge passage controlled by said valve, said controlling valve adapted to throttle flow through said discharge passage and having a spring to bias the same to close, a pressure responsive piston for actuating said controlling valve and having a fluid line connecting with said pressure source with said piston to operate said controlling valve in response to the pressure from said pressure source.

5. The combination with a source of pressure fluid of a counterbalance valve of the character described comprising a valve housing, a discharge passage in said housing for flow in one direction, a valve controlling discharge through said passage, a by-pass passage in said housing by-passing said valve to carry fluid flow in the opposite direction around said valve, a check valve in said by-pass passage closing the latter passage to discharge flow there through and confining discharge flow to flow through the discharge passage controlled by said valve, a pressure responsive piston means in said housing to actuate said controlling valve, a conduit connecting pressure from said pressure source to said piston for moving said piston and valve responsively to the pressure against said piston, and a dash pot for limiting the rate of opening movement of said valve, said dash pot having means for rendering said dash pot in operative to permit rapid closing of said valve.

6. A counterbalance valve comprising in combination a valve housing having a fluid supply passage therein, a throttling valve controlling said passage, a spring acting on said throttling valve to urge the same to closed position, a piston coaxial with said throttling valve and having a rod adapted to engage and unseat said valve against the pressure of said spring, a passage for pressure fluid leading to said piston, a reverse flow by-pass passage in said housing around said throttling valve, and a check valve in said by-pass passage to limit flow through said by-pass passage to reverse flow.

References Cited in the file of this patent
UNITED STATES PATENTS

| | | |
|---|---|---|
| 2,267,284 | Livers | Dec. 23, 1941 |
| 2,470,778 | Lankovski et al. | May 24, 1949 |
| 2,501,483 | Taylor | Mar. 21, 1950 |
| 2,608,824 | Kirkham | Sept. 2, 1952 |